(12) United States Patent
Humphries et al.

(10) Patent No.: US 7,594,038 B2
(45) Date of Patent: Sep. 22, 2009

(54) METHOD AND SYSTEM FOR REMOTELY CONFIGURING MOBILE TELEMETRY DEVICES

(75) Inventors: L. Scott Humphries, Clinton, MS (US); Gagan Puranik, Madison, MS (US); Huey-Jiun Ngo, Flowood, MS (US)

(73) Assignee: Verizon Business Global LLC, Ashburn, VA (US)

( * ) Notice: Subject to any disclaimer, the term of this patent is extended or adjusted under 35 U.S.C. 154(b) by 0 days.

(21) Appl. No.: 10/758,769

(22) Filed: Jan. 16, 2004

(65) Prior Publication Data

US 2005/0156735 A1      Jul. 21, 2005

(51) Int. Cl.
*G06F 3/00* (2006.01)
*G08B 5/22* (2006.01)
*G01C 21/00* (2006.01)

(52) U.S. Cl. .............. 710/8; 710/1; 710/10; 340/7.21; 701/207; 701/213

(58) Field of Classification Search ................ 710/1, 710/8, 10–12
See application file for complete search history.

(56) References Cited

U.S. PATENT DOCUMENTS 6,034,623 A * 3/2000 Wandel ............... 340/870.01

| 6,295,492 | B1 | 9/2001 | Lang et al. |
| 6,611,740 | B2 * | 8/2003 | Lowrey et al. ............... 701/29 |
| 6,636,790 | B1 | 10/2003 | Lightner et al. |
| 6,732,031 | B1 | 5/2004 | Lightner et al. |
| 6,754,583 | B2 | 6/2004 | Verbil |
| 2002/0173885 | A1 | 11/2002 | Lowrey et al. |
| 2003/0109988 | A1 * | 6/2003 | Geissler et al. ............. 701/213 |
| 2004/0176667 | A1 * | 9/2004 | Mihai et al. ................. 600/300 |
| 2004/0203696 | A1 * | 10/2004 | Jijina et al. ................. 455/420 |
| 2005/0071079 | A1 * | 3/2005 | Godfrey et al. ............. 701/207 |
| 2005/0177206 | A1 * | 8/2005 | North et al. ................. 607/60 |

\* cited by examiner

*Primary Examiner*—Alford W Kindred
*Assistant Examiner*—Richard Franklin

(57) ABSTRACT

An approach is provided for configuring telemetry devices over a wireless network is disclosed. A client (e.g., web browser application) communicates with a fleet and asset management system to obtain information about a plurality of objects (vehicle or asset). In response to the user input, the client transmits the user input to the fleet and asset management, wherein the fleet and asset management generates a configuration message based on the user input for transmission over the wireless network to the one telemetry device for configuring an input/output (I/O) port of the telemetry device. The I/O port is coupled to a corresponding one of the objects. The telemetry device sets parameters relating to the I/O port according to the configuration message.

30 Claims, 12 Drawing Sheets

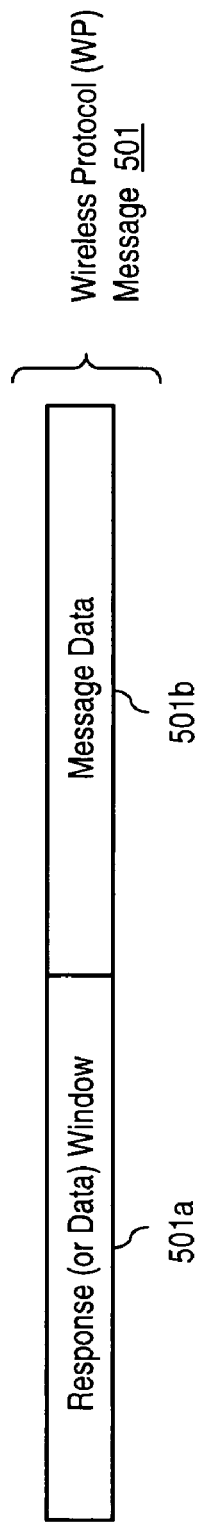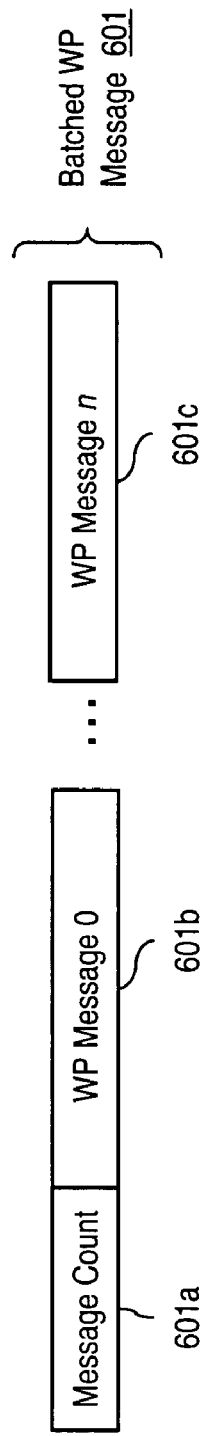
FIG. 5
FIG. 6

METHOD AND SYSTEM FOR REMOTELY CONFIGURING MOBILE TELEMETRY DEVICES

FIELD OF THE INVENTION

The present invention relates to data communications, and more particularly, to tracking mobile telemetry devices for fleet and asset management.

BACKGROUND OF THE INVENTION

Modern wireless networks, such as paging systems, can readily be configured to offer a variety of telemetry services, notably fleet and asset management. The management of vehicles within a fleet as well as assets involves obtaining information, generally in real-time, about the location and movement of these objects. The fleet manager utilizes this information to maximize use of fleet resources. With the advent of the Global Positioning System (GPS) supported by a constellation of satellites, a vehicle may determine its location with great accuracy and convenience if no obstruction exists between the GPS receiver within the vehicle and the satellites. Additionally, the infrastructure investment by service providers to implement a fleet and asset management system is significant. Consequently, such service providers are continually seeking new and enhanced services to derive maximal benefit (e.g., profits) from this large investment. Therefore, these service providers seek to offer an efficient, cost-effective fleet and asset management service with robust capability by effectively integrating GPS technology with wireless networks as to minimize bandwidth in the exchange of telemetry data.

FIG. 11 shows a diagram of a conventional wireless network in an autonomous GPS environment. As shown, a wireless network 1101 communicates with vehicles 1103 to track the location of these vehicles 1103 within the coverage area of the wireless network 1101. Each of the vehicles 1103 employ a GPS device 1105 that communicates with a constellation of satellites 1107. These satellites 1107 transmit very low power interference and jamming resistant signals received by the GPS receivers 1105. At any point on Earth, a GPS device 1105 is able to receive signals from multiple satellites (e.g., 6 to 11).

Specifically, a GPS device 1105 may determine three-dimensional geolocation from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by all of the GPS satellites 1107. The device 1105 must be able to identify the signals from at least four satellites 1107, decode the ephemeris and clock data, determine the pseudo range for each satellite 1107, and compute the position of the receiving antenna. The time required to acquire a position depends on several factors including the number of receiving channels, processing power of the receiving device, and strength of the satellite signals.

The above arrangement, as an autonomous GPS environment, has a number of drawbacks that can hinder its effectiveness as a fleet management system. Because the GPS device 1105 must obtain all of the ephemeris data from the satellite signals, weak signals can be problematic. A building location or a location in any area that does not have clear view of the satellite constellation 1107 can prevent the GPS device 1105 from determining its geolocation. Also, cold start acquisition may consume a few seconds to as much as a few minutes, which is a significant delay for the device's ability to log positional information and evaluate its position against pre-configured alert conditions.

The vehicles 1103 then need to transmit the location information to the wireless network 1101. These transmissions can consume large amounts of bandwidth of the wireless network 1101 if the location information is continually transmitted without attention to the polling scheme and the underlying transmission protocol used to transport such data.

Therefore, there is a need for a fleet and asset management system that effectively integrates GPS technology to ensure timely acquisition of location information. There is also a need to efficiently utilize precious resources of the wireless network in support of fleet and asset management services.

SUMMARY OF THE INVENTION

These and other needs are addressed by the present invention, in which an approach for configuring telemetry devices over a wireless network (e.g., paging system) is provided. The telemetry device includes a programmable input/output (I/O) port, which can be either digital or analog, that interfaces with an object (vehicle or asset). A fleet and asset management system transmits a configuration message over the wireless network to one of the telemetry devices for configuring the I/O port of the telemetry device. The telemetry device sets parameters (e.g., pin settings, electrical values, etc.) relating to the I/O port according to the configuration message. The fleet and asset management system can also issue a control message to the telemetry device to control operation of the telemetry device based on the state of the I/O port. Further, the fleet and asset management system can supply Assisted-Global Positioning System (A-GPS) data to the telemetry device, which itself is capable of autonomously obtaining GPS data from GPS satellites. The above arrangement advantageously provides flexibility and increased functionality for tracking telemetry devices in support of fleet and asset management.

According to one aspect of the present invention, a method for configuring telemetry devices over a wireless network is disclosed. The method includes storing transmitting a configuration message over the wireless network to one of the telemetry devices for configuring an input/output (I/O) port of the one telemetry device, wherein the I/O port couples to an object, and the one telemetry device sets parameters relating to the I/O port according to the configuration message. The method also includes receiving data corresponding to the I/O port of the one telemetry device for managing a plurality of objects corresponding to the telemetry devices.

According to another aspect of the present invention, a fleet and asset management system for configuring telemetry devices over a wireless network is disclosed. The system includes a presentation server configured to generate a configuration message for transmission over the wireless network to one of the telemetry devices for configuring an input/output (I/O) port of the one telemetry device, wherein the I/O port couples to an object, and the one telemetry device sets parameters relating to the I/O port according to the configuration message. Additionally, the system includes a messaging server configured to transmit the configuration message and to receive data corresponding to the I/O port of the one telemetry device for managing a plurality of objects corresponding to the telemetry devices.

According to another aspect of the present invention, a computer-readable medium carrying one or more sequences of one or more instructions for configuring telemetry devices over a wireless network is disclosed. The one or more sequences of one or more instructions including instructions which, when executed by one or more processors, cause the one or more processors to perform the step of transmitting a configuration message over the wireless network to one of the telemetry devices for configuring an input/output (I/O) port of the one telemetry device, wherein the I/O port couples to an object, and the one telemetry device sets parameters relating to the I/O port according to the configuration message. Another step includes receiving data corresponding to the I/O port of the one telemetry device for managing a plurality of objects corresponding to the telemetry devices.

According to another aspect of the present invention, a method for configuring telemetry devices over a wireless network is disclosed. The method includes communicating with a fleet and asset management system to obtain information about a plurality of objects. The method also includes receiving a user input relating to configuration of one of a plurality of telemetry devices corresponding to the plurality of objects. Further method includes, in response to the user input, transmitting the user input to the fleet and asset management, wherein the fleet and asset management generates a configuration message based on the user input for transmission over the wireless network to the one telemetry device for configuring an input/output (I/O) port of the one telemetry device, the I/O port being coupled to a corresponding one of the objects, and the one telemetry device setting parameters relating to the I/O port according to the configuration message.

According to yet another aspect of the present invention, a client device for configuring telemetry devices over a wireless network is disclosed. The device includes means for communicating with a fleet and asset management system to obtain information about a plurality of objects; means for receiving a user input relating to configuration of one of a plurality of telemetry devices corresponding to the plurality of objects; and means for transmitting the user input to the fleet and asset management, in response to the user input. The fleet and asset management generates a configuration message based on the user input for transmission over the wireless network to the one telemetry device for configuring an input/output (I/O) port of the one telemetry device, the I/O port being coupled to a corresponding one of the objects, and the one telemetry device setting parameters relating to the I/O port according to the configuration message.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a diagram of the format of a Wireless Protocol (WP) message used in the system of FIG. 1;

FIG. 6 is a diagram of the format of a batched Wireless Protocol (WP) message used in the system of FIG. 1;

FIGS. 8b and 8c are diagrams of the formats of a digital Input/Output (I/O) configuration message and a digital I/O control message, respectively, used in the process of FIG. 8a;

DESCRIPTION OF THE PREFERRED EMBODIMENT

A system, method, and software for configuring a telemetry device in support of fleet and asset management are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
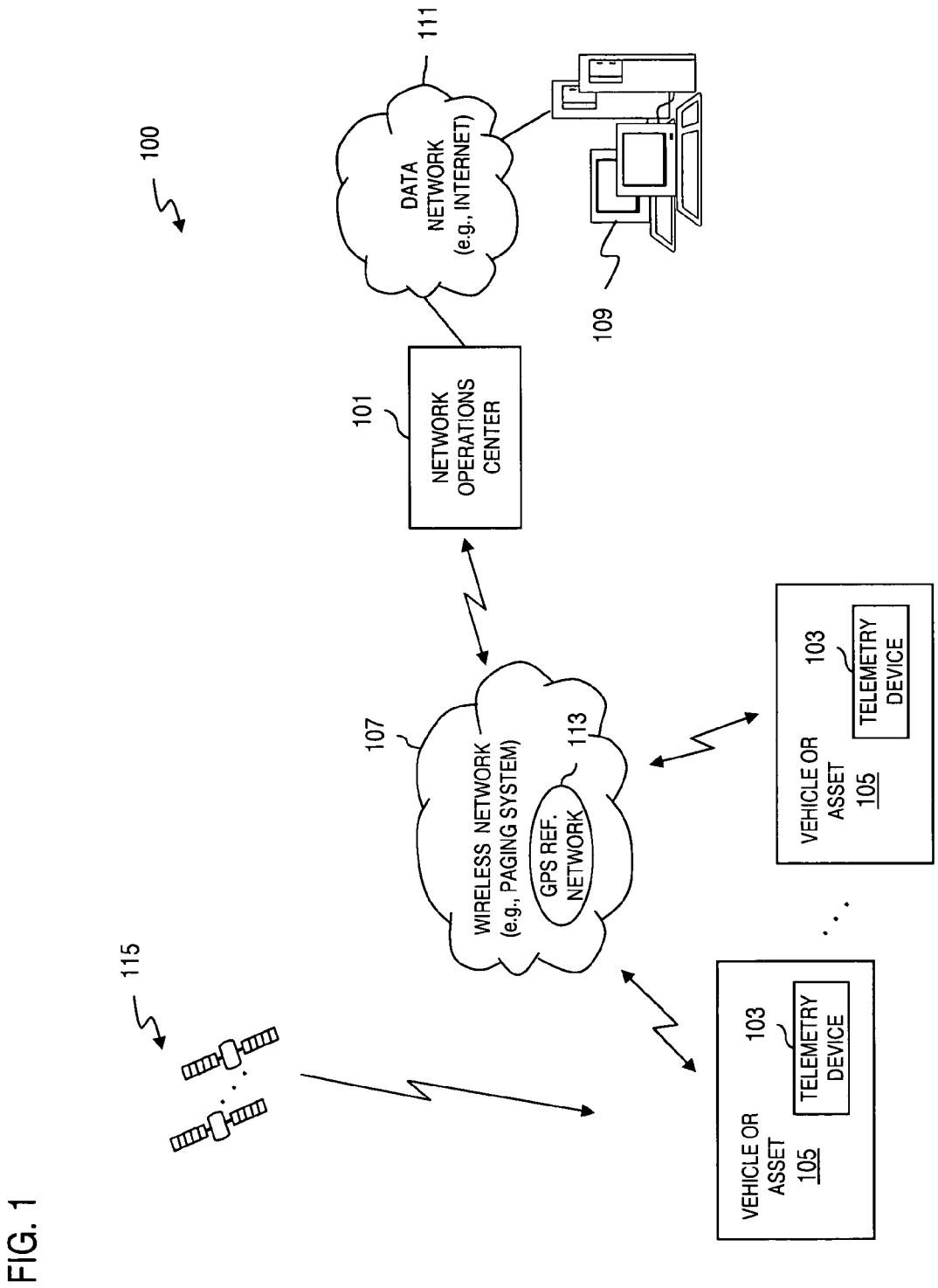
FIG. 1 is a diagram of a fleet and asset tracking system, according to an embodiment of the present invention.
Figure 11:
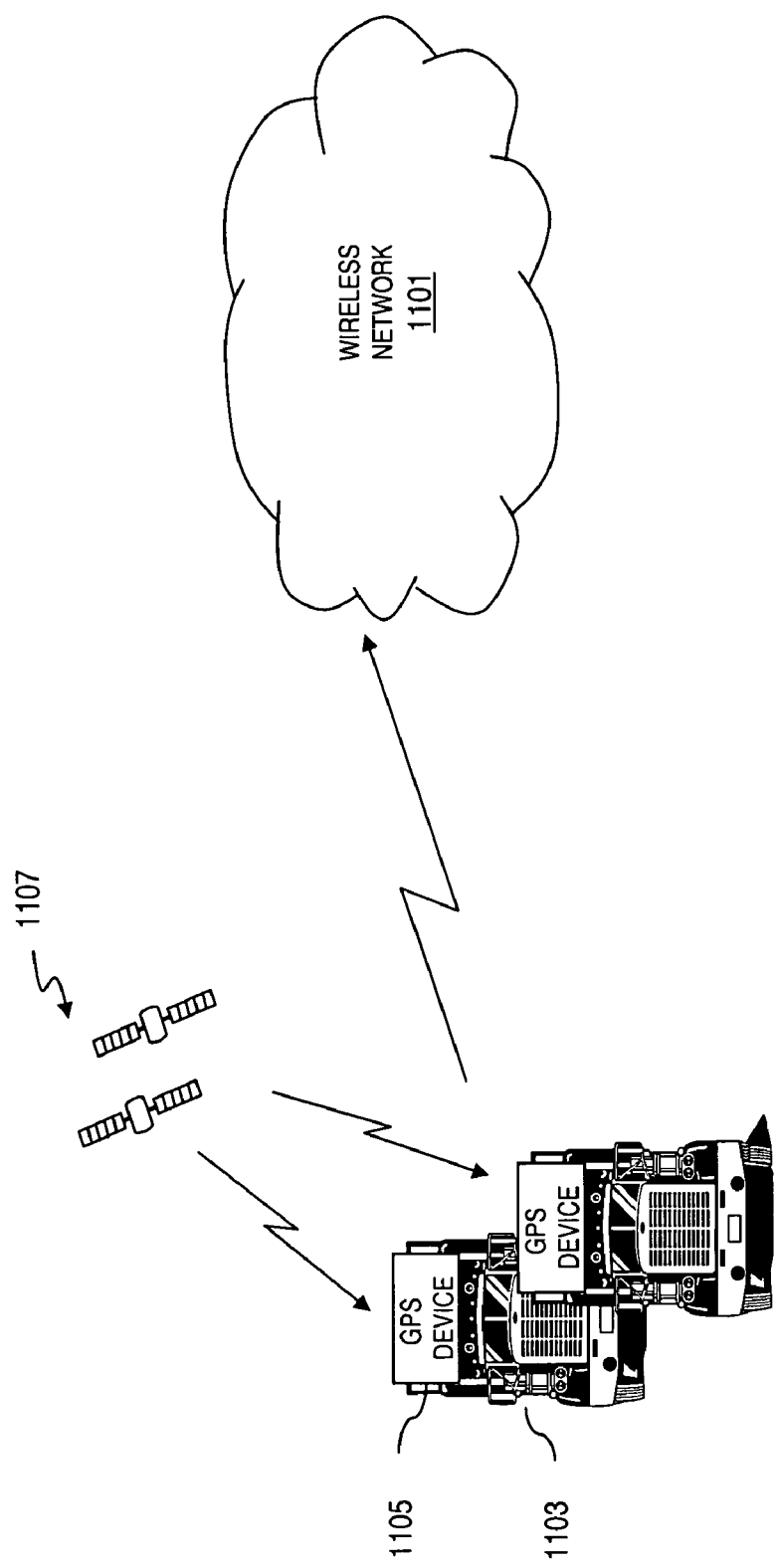
FIG. 11 is a diagram of a conventional wireless network in an autonomous GPS environment.

FIG. 1 shows a diagram of a fleet and asset tracking system, according to an embodiment of the present invention. The system 100, in contrast to the system of FIG. 11, utilizes a combination of autonomous GPS and Assisted GPS (A-GPS); in particular, mobile-centric A-GPS. The system 100 includes a Network Operation Center (NOC) 101 for tracking telemetry devices 103, which, under this scenario, are resident within vehicles 105. It is contemplated that the telemetry device 103 can be affixed to an asset (or any other object). A wireless network 107 supports two-way communication among the telemetry devices 103 and the NOC 101; the wireless network 107, in an exemplary embodiment, is a two-way paging system employing the ReFLEX™ protocol by Motorola for two-way advanced messaging. The telemetry devices 103 have two modes of operation: autonomous GPS mode, and A-GPS mode. When operating in A-GPS mode, the system 100 can provide for better in building or obstructed view geolocation with in a paging system zone. When out of network coverage, the autonomous GPS may be used to obtain geolocation data that may be stored on the device for later transmission.

According to one embodiment of the present invention, the wireless network 107 provides over the air encrypted messages.

The NOC 101 provides the necessary fleet and asset management functions, such as user account creation and management, access control, and deployment of business rules; these functions are more fully described below with respect to FIG. 3. The NOC 101 also supports remote management capabilities by hosts 109 over a data network 111, such as the global Internet.

To better understand the hybrid A-GPS environment of the system 100, it is instructive to describe the operation of the general operation of a mobile-centric A-GPS system. The telemetry device 103 has GPS hardware and intelligence, whereby the network 107 in conjunction with the NOC 101 employs mechanisms for providing GPS aiding data (or assistance data). The network 107 includes base transmitters and some base receivers containing GPS hardware from which the ephemeris and approximate location can be obtained, constituting a GPS reference network 113.

The assistance data that is transmitted to the devices 103, in an exemplary embodiment, can include ephemeris data differential GPS correct data, timing data and/or other aiding data. Using the aiding (or assistance) data, the telemetry devices 103 perform geolocation calculations, yielding a number of advantages. For example, the telemetry devices 103 can generate real-time speed and route adherence alerts. Additionally, transmission of geolocation data need not be frequent. Transmission of geolocation data is more compact because it is true location rather than pseudo range data. Also, the telemetry devices 103 themselves can determine when the ephemeris data is no longer valid.

The hybrid A-GPS system 100 thus permits fast and precise geolocation when in network coverage of the network 101, while providing immunity from obstructed view of the sky. Also, when the switch is made to autonomous GPS mode (when outside of the coverage area of the network 101), the devices 103 can still obtain geolocation data. This data can be stored within the device 103 and transmitted to the NOC 101 when the associated vehicle 105 returns to the network coverage area.

As noted earlier, the telemetry devices 103 may be attached to a host entity such as a vehicle or other valuable asset. The device may be used to track, monitor, and control aspects of the host entity. These devices 103 are configurable with respect to the existence and number of digital inputs/outputs (I/O), analog inputs/outputs (I/O), and device port interfaces for connection with peripheral devices. By way of examples, the digital inputs can be used to monitor various components of the vehicles 105: ignition status, door lock status, generic switch status, headlight status, and seat occupancy status. The digital outputs can be used to control, for example, the starter, and door locks, and to monitor such parameters as engine temperature, cargo temperature, oil pressure, fuel level, ambient temperature, and battery voltage. The exact configuration of the telemetry devices 103 can be based on cost consideration and/or applications.

The telemetry devices 103, in an exemplary embodiment, employ a wireless protocol to receive commands and transmit data and alerts (e.g., high speed alert) over the radio network 107. The telemetry devices 103 can queue alerts, message responses, and scheduled data, whereby if the devices 103 are unable to send the messages, the messages are queued and sent when the device 103 returns to wireless network coverage. Prioritized queues are used and include, for example, queues for high, normal, and low priority messages. In the exemplary implementation, critical device status changes are given highest priority, while other alerts and responses are given normal priority. Scheduled data messages are given the lowest priority. The queues are configured, as first in yields first out, wherein new messages are dropped when its corresponding queue is full. This arrangement advantageously allows for the status of the device 103 at the time of transmission failure to be known even when the data stored in the data log at time of the transmission has been overwritten.

The telemetry devices 103 can also respond to status (e.g., of position, speed, digital I/O port status, analog input channel status, peripheral status or other device status) queries transmitted by the NOC 101. The status query may request either current status or status within a time and date range. The device 103 responds to the query with either the current status or all status within the date and time range that is currently stored in the device's data log.

As regards data logging, the devices 103 support use of one or more schedules for the data acquisition. The data logging involves storing of the data locally on the device 103. This data, which can include position, speed, digital I/O port status, analog input channel status, peripheral status or other device status is not automatically transmitted over the air. Instead, the data is stored for a finite period of time and made available for use by scheduled data acquisitions, data acquisitions on demand, and data acquisitions associated with alerts. The data log is circular in that when the last available memory for the data logger has been written, the data logger begins recording new data at the first location of memory available for the data logger.

With scheduled acquisitions of the data collected by the data logger, the data within the data log is transmitted by the device 103 according to a configurable schedule at the configured transmission rate. Multiple schedules may be configured on the device 103. Schedules are configured to obtain data at a regular interval based upon calendar time and date. Schedules may be configured such that they are enabled and disabled based upon status of a digital input. For example, an ignition status input may be used to turn a schedule on when the engine is on and turn the schedule off when the engine is off. A Response (or Data) Message Window value can be configured on the device 103, such that the device 103 delays sending scheduled data using an Offset within the Data Message Window (shown in FIG. 5). That is, the scheduled transmit time is adjusted by the Offset, the device 103 delays queuing the scheduled data until the time is equal to the transmit time plus the Offset. Use of the Data Message Window helps prevent overwhelming the wireless network when many devices are scheduled to transmit data at the same time. For example, it is likely that many schedules will be based upon transmitting on the hour, half past the hour, or at fifteen minute intervals. Using the Offset ensures that the scheduled data transmissions from all of the devices with similar schedules are not sent at precisely the same time. Given the precision of the telemetry device's clock (as it is based upon GPS time), this randomization of regularly scheduled device transmissions is particularly useful.

As mentioned previously, the telemetry devices 103 can be configured to monitor a variety of information relating to the vehicle or asset through the digital I/O and analog I/O. For instance, alerts can be used to indicate status change of the digital inputs. Each Digital Input Status Change Alert can be enabled and disabled through configuration. The alert may be configured to transmit other device status recorded at the time of the alert such as position, speed, status of other digital I/O ports, analog input status, peripheral status, or other device status. As regards the digital output, the status of each available digital output can be changed or read.

Similarly, the statuses of analog inputs of the devices 103 are monitored for change. In an exemplary embodiment, multiple threshold levels (e.g., high and low) can be set, whereby alerts are generated (e.g., Low Range Entry alert, Low Range Exit, High Range Entry, and High Range Exit). That is, if the value of the Analog Input falls below the Low Threshold, a Low Range Entry Alert is generated. If the value of the Analog Input rises above the Low Threshold plus a Hysteresis is value, a Low Range Exit Alert is generated. In similar fashion, if the value of the Analog Input rises above the High Threshold, a High Range Entry Alert is output from the device 103. Also, if the value of the Analog Input falls below the High Threshold minus a Hysteresis value, a High Range Exit Alert is generated. The alert may be configured to transmit other device status recorded at the time of the alert such as position, speed, status of other digital I/O ports, analog input status, peripheral status, or other device status.

By way of example, the devices 103 can be used to monitor excessive speed via a High Speed Alert Control, whereby a High Speed Threshold can be set by a fleet manager. In addition, a duration parameter (i.e., High Speed Duration) can be utilized to specify the time at which the High Speed Threshold must be exceeded before an alert is generated. Further, a configurable High Speed Hysteresis parameter is set as the delta change below the High Speed Threshold used to determine when the High Speed Threshold has no longer been exceeded. The alert may be configured to transmit other device status recorded at the time of the alert such as position, speed, status of other digital I/O ports, analog input status, peripheral status, or other device status.

The system 100 also permits users via the hosts 109 to specify and configure areas of interest within the coverage area of the network 101 such that alerts can be generated when a device 103 enters or exits the configured areas. The alert may be configured to transmit other device status recorded at the time of the alert such as position, speed, status of other digital I/O ports, analog input status, peripheral status, or other device status.

Figure 3:
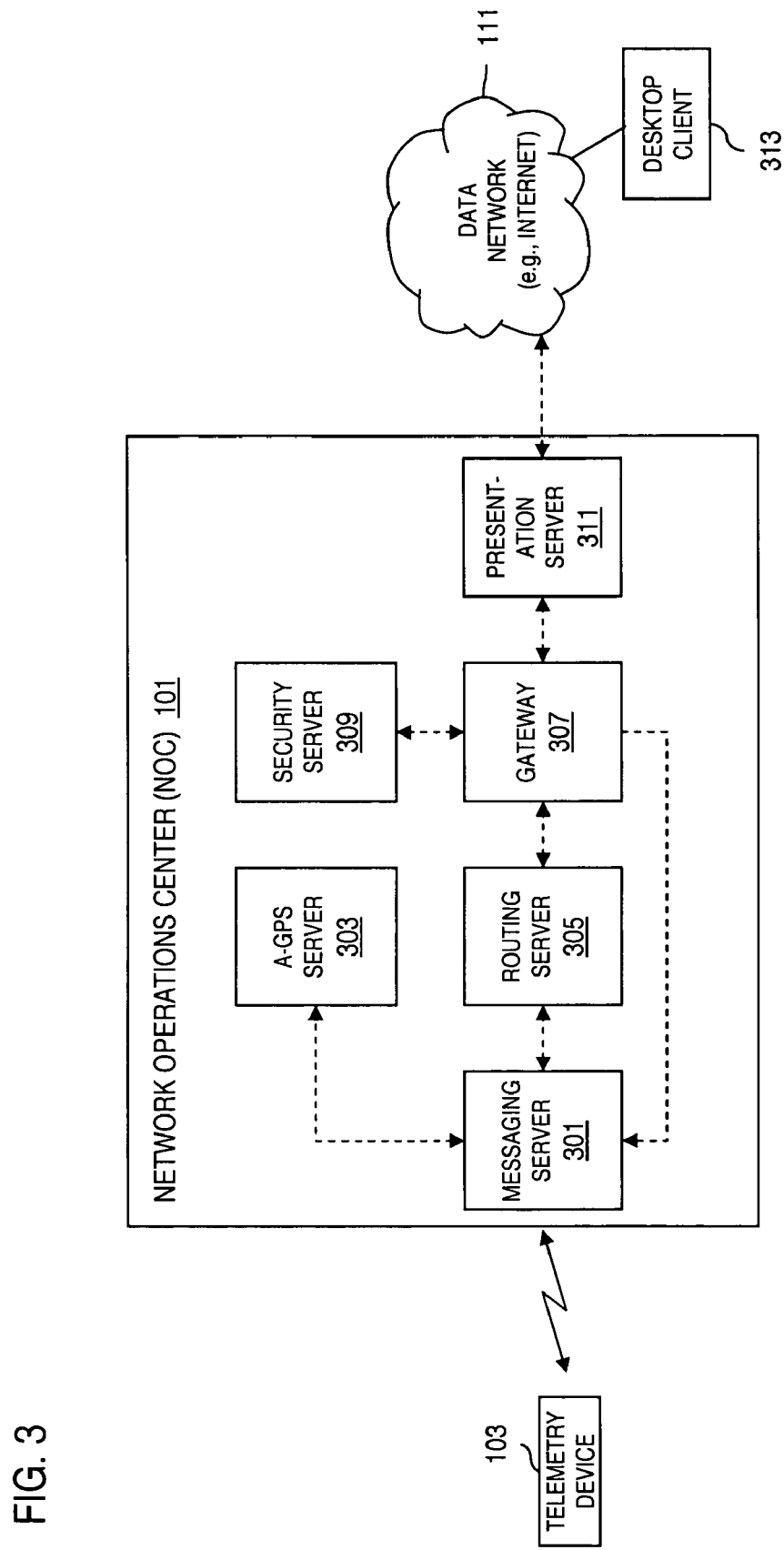
FIG. 3 is a diagram of a Network Operations Center (NOC) in the system of FIG. 1, according to an embodiment of the present invention.

The data collected and transmitted by the telemetry devices 103 are processed by the NOC 101, the components of which are described in FIG. 3.

Figure 2:
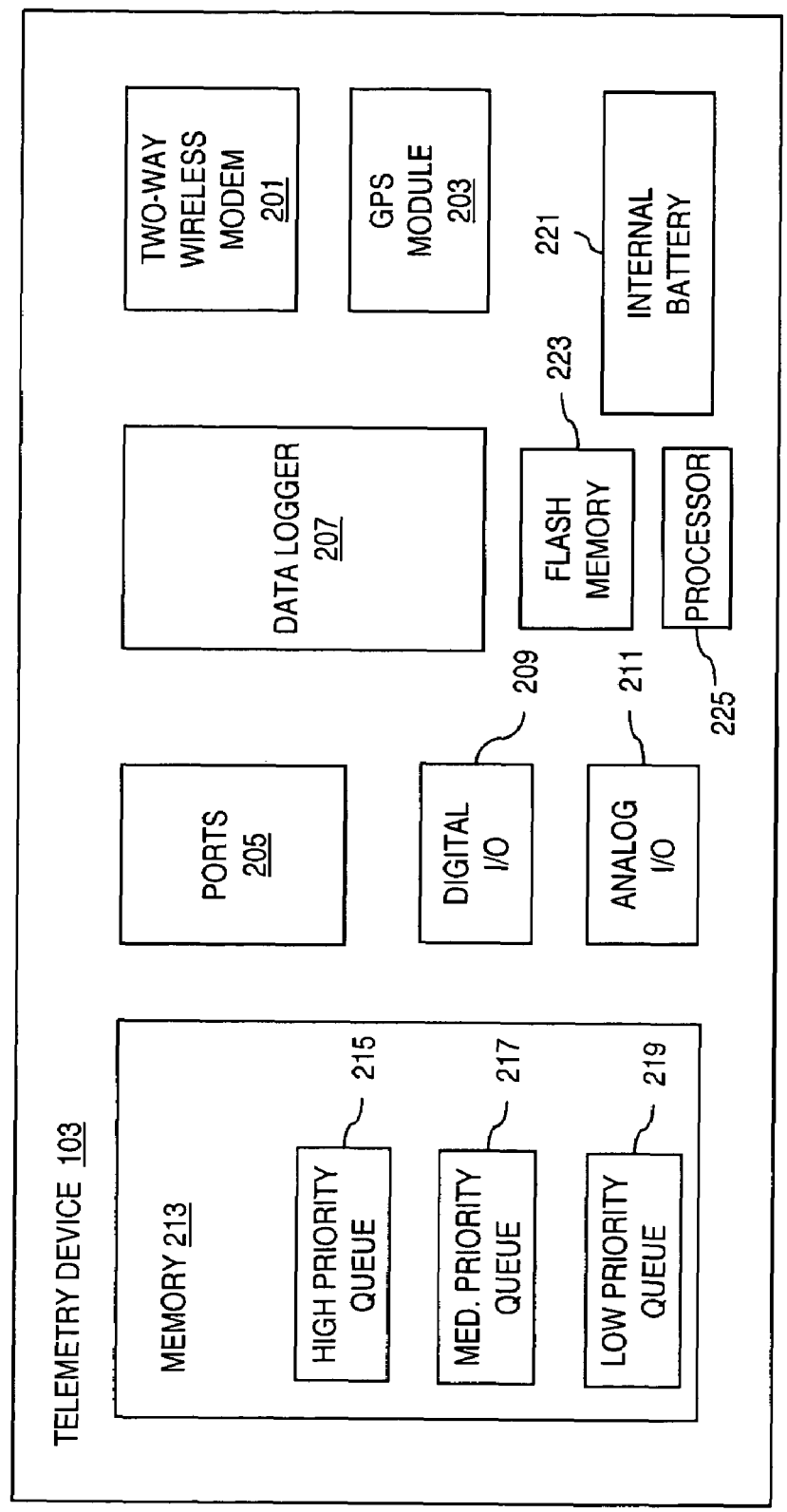
FIG. 2 is a diagram of a telemetry device used in the system of FIG. 1, according to an embodiment of the present invention.

FIG. 2 shows a diagram of a telemetry device used in the system of FIG. 1, according to an embodiment of the present invention. The telemetry device 103, which can be deployed within a vehicle (as shown in FIG. 1 or coupled to any asset), operates within the wireless network 107. By way of example, the components of the telemetry device 103 are described in the context of a narrowband network, such as a paging system; however, it is contemplated that the components for communications can be tailored to the specific wireless network.

In this exemplary embodiment, the telemetry device 103 includes a two-way wireless modem 201 for receiving and transmitting signals over the wireless network 107 according to the communication protocols supported by the wireless network 107, such as the Motorola ReFLEX™ protocol for two-way paging. By way of example, a Karli ReFLEX™ module by Advantra International can be used for the modem 201. The two-way wireless modem 201 couples to a two-way wireless antenna (not shown) that can be placed local to the device 103 or remote from the device 103 (e.g., 12 or more feet) to enhance flexibility in installation.

The telemetry device 103 also contains a GPS module 203 that is capable of operating in the multiple GPS modes: autonomous GPS mode, and mobile-based A-GPS mode. The GPS module 203 can employ, for example, a GPS receiver manufactured by FastraX-iTrax02/4. In autonomous mode, GPS data may be acquired with no assistance data provided by the wireless network 107. The GPS module 203 operates in the A-GPS mode when the device 103 is in wireless network coverage, in which assistance data is supplied and can include ephemeris data and data to obtain location in obstructed view locations (in building, wooded areas, etc.). Further, the assistance can include differential GPS (DGPS) to enhance location accuracy under some conditions. The GPS module 203 couples to a GPS antenna (not shown) that can be placed local to the device 103 or remote from the device 103 (e.g., 12 or more feet) to enhance flexibility in installation.

Attachment of peripheral modules to the telemetry device 103 are supported by one or more peripheral ports 205. The ports 205, for example, can be used to connect to intelligent peripherals that operate according to business rules and logic. These business rules and logic can be housed in a vehicle harness (not shown), which include an On-Board Diagnostic (OBDII) interface and intelligence. Under this arrangement, a user (e.g., fleet manager) can query any parameter available through the OBDII interface. For example, data obtained for each tracking record can include any combination of the following items: RPM (Revolutions Per Minute), oil pressure, coolant temperature, etc. Such data recorded by the telemetry device 103 is stored in memory 213. The acquisition period for the data is configurable, as well as the transmission interval to the NOC 101. Furthermore, the monitoring and subsequent data exchange can be governed by a configurable schedule, which can specify such parameters as start date, start time, end time, recurrence (e.g., daily, weekly, monthly, etc.), and duration.

Data is logged by a data logger 207, made available for use by scheduled data acquisitions, data acquisitions on demand, and data acquisitions associated with alerts. As mentioned, the telemetry device 103 also can be configured to include digital I/O 209 and analog I/O 211 for monitoring and control of the vehicle or asset. The data logger 207 also collects data associated with these I/O ports 209, 211.

The telemetry device 103 also includes a processor 225 that may handle arithmetic computations, and may support operating system and application processing. The processor 225, while shown as a single block, may be configured as multiple processors, any of which may support multipurpose processing, or which may support a single function.

The memory 213 of the telemetry device 103 can be organized to include multiple queues for prioritizing the messages to be processed by the device 103. In an exemplary embodiment, the memory 213 includes a High Priority queue 215, a Medium Priority queue 217, and Low Priority queue 219. The memory 213, while shown as a single block, may be configured as multiple memory devices, any of which may support static or dynamic storage, and may include code for operating system functionality, microcode, or application code.

Data recorded by the telemetry device 103 may additionally be stored in a storage medium other than the prioritized queues 215, 217, and 219, such as in a flash memory 223. A log (not shown) of information may be kept so that the information may be transmitted according to a schedule, as discussed above, or, e.g., upon receipt of a request to send all data that has been collected. Storage devices have only a finite amount of space for storage of information, and thus the information for only a finite number of messages may be stored in either the prioritized queues 215, 217, 219 or the flash memory 223.

To improve availability of the telemetry device 103, an internal battery 221 is optionally included. With the internal battery, the telemetry device 103 can continue to monitor and transmit alerts and status information to the NOC 101 even if the electrical system of a vehicle is inoperable. Additionally, the internal battery 221 can be used by the device 103 to gracefully report power status wirelessly and shut down gracefully when the energy level of the internal battery is becoming to low to sustain operation of the device The functions of the NOC 101, which interacts with the telemetry devices 103 to exchange information for supporting fleet and asset management, are detailed with respect to FIG. 3.

FIG. 3 shows a diagram of a Network Operations Center (NOC) in the system of FIG. 1, according to an embodiment of the present invention. The NOC 101 utilizes, in this exemplary embodiment, a client-server architecture to support the telemetry devices 103. Specifically, the NOC 101 houses a messaging server 301 for sending and receiving messages to the devices 103 over the air, for storing the messages, and routing these messages to their destination. The NOC 101 provides connectivity via a local area network (LAN) (not shown) for the messaging server 103 with an A-GPS server 303, a routing server 305, and a gateway 307. The gateway 307 communicates a with a security server 309 to support encryption and decryption of the messages. A presentation server 311 resides within the NOC 101 to interface with the data network 111 (e.g., the global Internet), such that the host 109 can access the services of the fleet and asset management system. The host 109 under this scenario is loaded with a desktop client 313.

Although a single server is shown for the presentation server 311, in the alternative, the server 311 can functionally be implemented as three separate servers: a database server, a middleware server, and a web server. The database server is responsible for data storing, data updating, and data retrieval as well as providing a set of interfaces to achieve these functions. The web server is responsible for serving maps, presenting user interfaces to manage and control user administration, device configuration, and etc. The middleware server can be deployed between the database server and the web server, and has the following responsibilities: 1) converting the web server's data retrieval requests to database server APIs and then sending to database server, 2) receiving the responses from the database server and then sending back to web server, 3) receiving data from gateway 307 and then sending requests to the database to store/update data records. Because of the modularity in this design, these three components can reside on the same machine, as shown in FIG. 3, or reside in multiple platforms.

Messages from the telemetry devices 103 are forwarded by the messaging server 301 to either the A-GPS server 303 or the routing server 305. If the message is an assist request, this message is sent to the A-GPS server 303. In response to the GPS assist request, the A-GPS server 303 determines GPS assistance data for transmission to the requesting telemetry device 103. Page: 18

The A-GPS server 303 obtains ephemeris data from the GPS reference network 113, and determines satellite configuration for each of the geographic zones comprising the wireless network. The A-GPS server 303 also determines the assistance data for each geographic zone. The NOC 101 then periodically broadcasts the assistance data to each geographic zone. In addition, the A-GPS server 303 supplies GPS assistance data to any telemetry device 103 that requests the GPS assistance data. When supporting this request, the NOC 101 determines approximate location of the requesting device 103 (based upon base receivers that received the request, using a type of triangulation. Subsequently, a GPS Assistance message is generated by the A-GPS server 303 to send to the telemetry device 303 based upon its approximate location. The messaging server 301 sends the GPS Assistance message to the particular telemetry device 103.

Thus, the A-GPS server 303 delivers GPS assistance data through two mechanisms by periodically broadcasting GPS assistance data to all devices 103 in each of the geographic zones covered by the wireless network 107, or by responding to specific requests by the telemetry devices 103 for GPS assistance data.

The routing server 305 has responsibility for routing of the messages from the telemetry devices 103, and managing such messages from the devices 103 to their server destinations. Each device 103 can be configured to have messages directed to one or more destination servers. The routing server 305, upon receiving message from a telemetry device 103, determines a destination address that has been configured for the device 103 and modifies the destination address accordingly. The message is then forwarded to the configured destination. By default, the messages are directed to the gateway 307.

The gateway 307 interfaces with the presentation server 311 to permit the desktop client 313 access to the fleet and asset management system. The gateway 307 provides translation of wireline messages and commands from the presentation server 311 to the wireless protocol for communication with the telemetry devices 103. For example, the gateway 307 supports an extensible Markup Language (XML) interface, such that XML commands submitted to the gateway 307 over wireline are converted to the wireless protocol commands and sent over the paging network 107 to the devices 103. In turn, the wireless protocol messages received from the devices 103 are converted to wireline XML messages. The gateway 307 provides translation of wireline messages and commands from the host 109 to the wireless protocol for communication with the telemetry devices 103. In turn, the wireless protocol messages received from the devices 103 are converted to wireline XML messages and sent to host 109.

The presentation server 311 provides the following functions: fleet and asset tracking, and general purpose I/O monitoring and control. The server 311 also maintains a database (not shown) for user accounts and other related data (e.g., configuration data, user management information, device management, and data acquired from the devices 103). The presentation server 311, as mentioned, also generates the maps corresponding to where the devices 103 are tracked and the mapping preferences configured. Using the desktop client 313, a user can even issue requests to command a particular device 103, such as requesting location of the device 103.

With the presentation server 311 as a front end, a user via the desktop client 313 can configure the telemetry devices 103 via web interfaces. In an exemplary embodiment, the server 311 is a World Wide Web ("web") application server to support a web browser based front-end for the desktop clients 109. The web application server (not shown) can be deployed to support such web interfaces as a set of Java Server Pages (JSP) and Java Applet to interact with the user on the desktop client 313. On the backend, based on data collected by JSP and Java Applet, the web server can generate the proper XML commands that are compliant with Application Programming Interface (API) of the presentation server 311. Consequently, the collected records can be stored in the database of the presentation server 311. The database also stores the properties of the telemetry devices 103, such as the alerts and thresholds earlier described.

The desktop client 313 interfaces to the system 100 through the presentation server 311. From the desktop client 313, the user logs in to the system 100. The presentation server 311 can also perform authentication as well as administration tasks such as adding new users or devices 103. The user can also configure business rules executed by the presentation server 311, wherein the business rules logic uses this user supplied configuration to configure the devices 103, acquire, and process data from the devices 103.

Additionally, the presentation server 311 provides a reporting capability based on the stored information in the database. The presentation server 311 can support standard reports or customize reports to the user via the desktop client 313.

Figure 7:
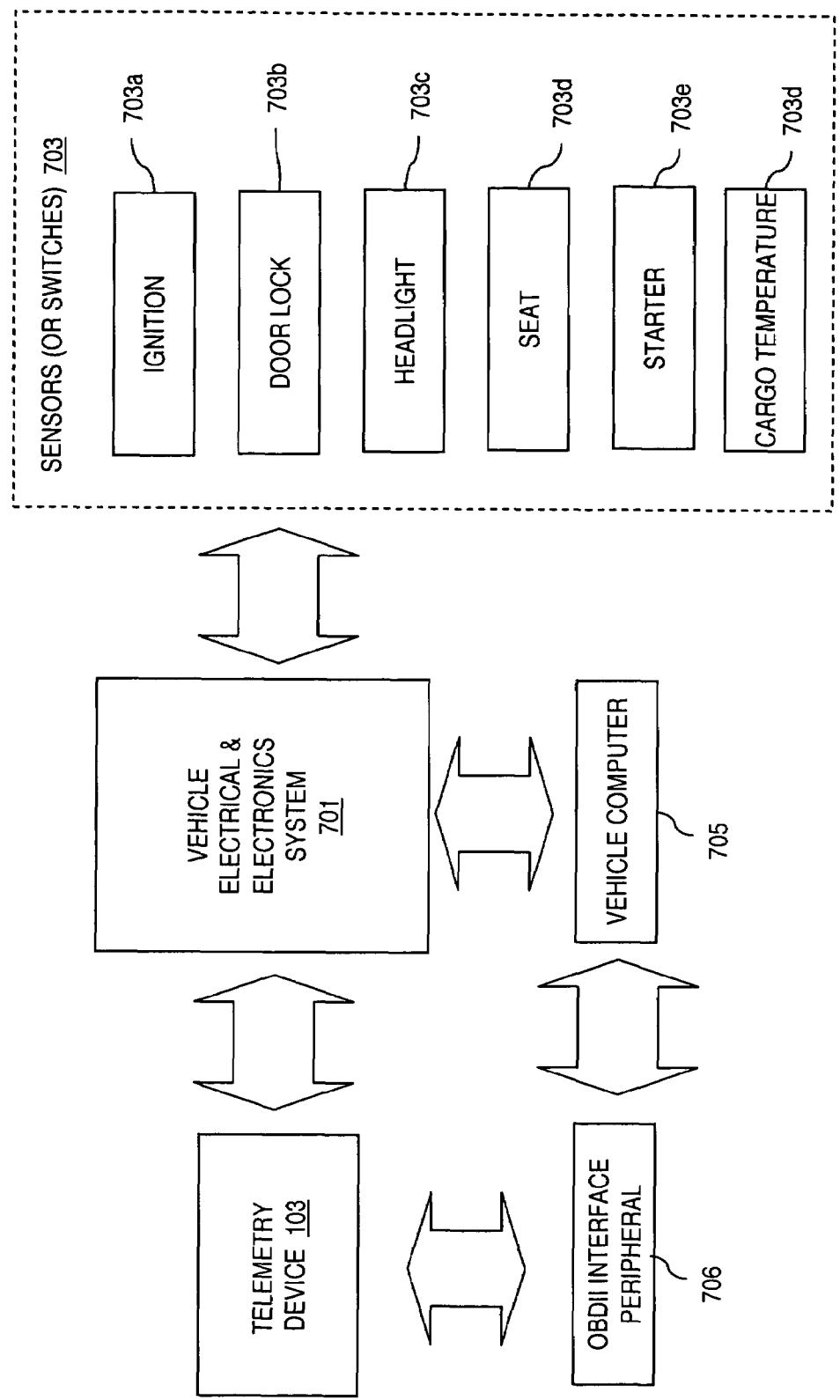
FIG. 7 is a diagram of the telemetry device of FIG. 2 deployed within a vehicle, according to an embodiment of the present invention.

Instead of using a desktop client 313, the user, if associated with a large organization, can utilize an enterprise server to obtain all of the user functionality through the gateway 307 using the API of the fleet and asset management system 100. Accordingly, the enterprise server would possess the functional capabilities of the presentation server 311, but would be managed by the customer (or user) at the customer's premise, as shown in FIG. 7.

As noted, the wireless protocol supports communications between the NOC 101 and the telemetry devices 103. In an exemplary embodiment, the messaging is performed according the FLEXsuite Uniform Addressing & Routing (UAR) protocol (developed by Motorola). The wireless protocol message, which can be encapsulated with an UAR message, is unencrypted.

Figure 4:
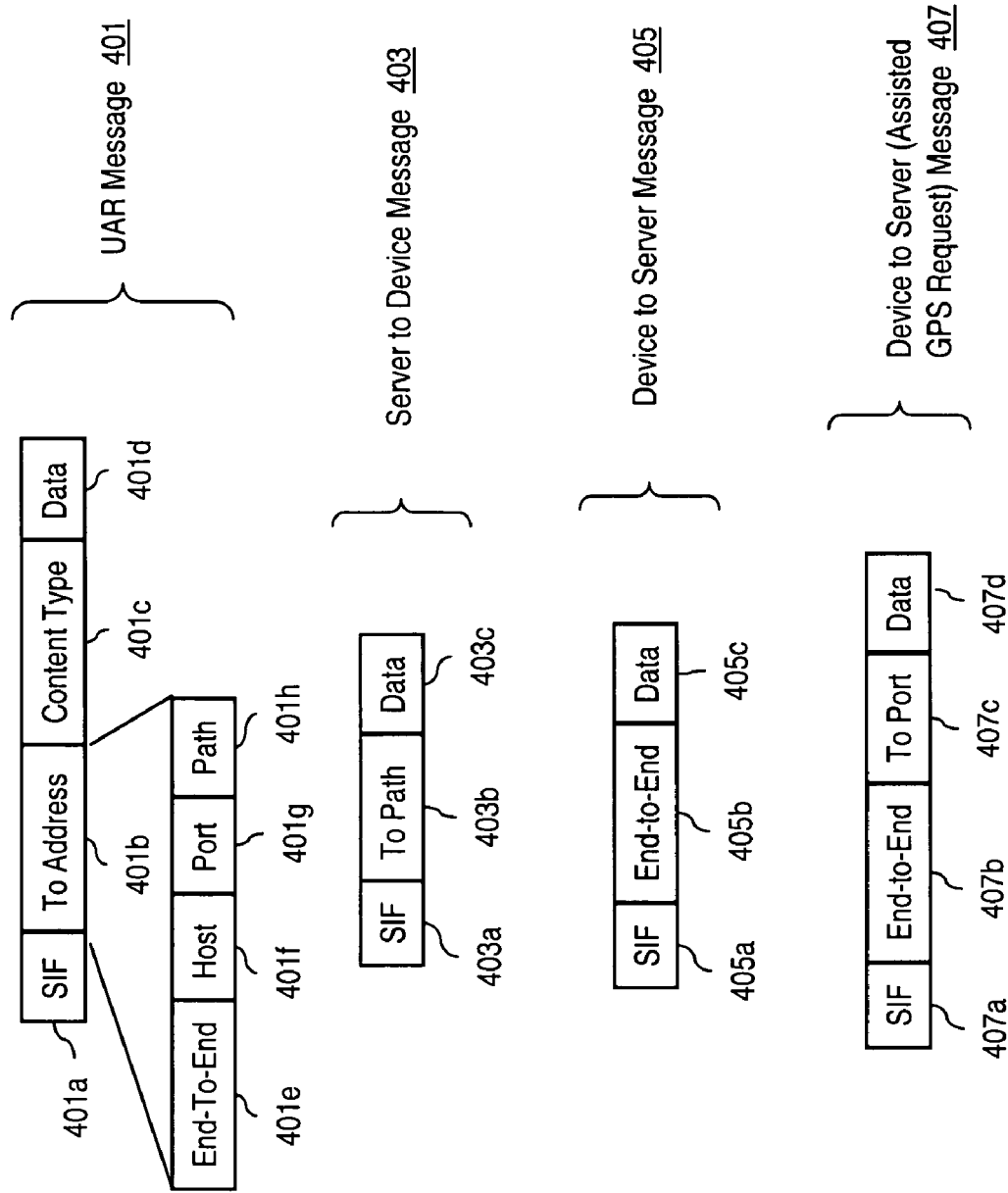
FIG. 4 is a diagram of the formats of protocol messages used in the system of FIG. 1.

FIG. 4 shows a diagram of the formats of protocol messages used in the system of FIG. 1. By way of example, the protocol is the UAR protocol. Accordingly, a UAR message 401 includes the following fields: a Status Information Field (SIF) field 401a, a Destination Address ("To Address") field 401b, a Content Type field 401c, and a Data field 401d. Table 1, below, defines these fields 401a-401c.

TABLE 1

| Field | Definition | Data Type | Size |
| --- | --- | --- | --- |
| SIF | Identifies the application protocol used to encode the remaining data in the message; indicates UAR addressing is used | Integer | 8 bits |
| To Address | Destination Address | UAR "To Address" Encoding | Variable |
| Content Type | Identifies the format of the attached Data | UAR Content Type | 24 bits |
| Data | UAR format data payload | UAR data | Variable |

With respect to the "To Address" field 401b, this address can be further specified the following fields: an End-To-End field 401e, a Host field 401f, a Port field 401g, and a Path field 401h. The End-To-End field 401e is utilized for device to server routing. It is noted that no addressing is needed for device to server routing with the exception of an Assisted GPS Request message. Because the routing server 305 controls message routing from the telemetry device 103, some of the address information requirement is specific to UAR. Path Addressing, per the Path field 401h, is used for server to device routing, as in the case, for example, addressing of a peripheral device attached to the telemetry device 103. As shown in FIG. 4, for server to device messaging, message 403 can be used and includes a SIF field 403a, a To Address field 403b specifying the path, and a Data field 403c. A device to server message 405 utilizes a SIF field 405a, a To Address field 405b specifying the End-to-End address, and a Data field 405c. In the case of a device to server transmission relating to acquisition of Assisted GPS (e.g., in form of an Assisted GPS request), a message 407 is provided, and includes a SIF field 407a, a To Address field specifying the End-to-End address 407b and Port 407c, and a Data field 405c.

As regards UAR messages in general, the Data field 401d contains binary formatted data, which is the unencrypted Wireless Protocol (WP) message (as described in FIGS. 5 and 6).

FIG. 5 shows a diagram of the format of a Wireless Protocol (WP) message used in the system of FIG. 1. A Wireless Protocol message 501 includes a Response Window (or Data Window) field 501a to regulate the over-to-air transmission of the message from the telemetry device 103 to the NOC 101, as described previously. In other words, with the telemetry devices 103, accommodation is made to support staggering of device responses to prevent overwhelming the reverse path of the wireless network 107 (FIG. 1) if a command is sent to a large number of devices in a broadcast message. The Response Window field 501a is thus used to specify a desired time frame for obtaining responses from deployed devices 103. If a Response Window is specified in a message, the device 103 delays sending its response using an Offset value within the Response Window when responding to the message. That is, after first processing the message, the device 103 delays sending the response to the message until the Offset time has expired. To ensure a good distribution of responses during the Response Window, the device 103, in an exemplary embodiment, can randomly select an Offset time within the specified time window.

The message 501 also provides a Message Data field 501b for specifying the data (such as data within the data log, and alerts). According to one embodiment of the present invention, the NOC 101 can batch the WP messages 501 to reduce overhead, resulting in a batched message 601. The batched message 601 specifies a Message Count field 601a to indicate the number of WP messages 501 (0 . . . n, where n is an integer) that are contained within the batched message 601. The WP Message fields 601b, 601c pertain to the corresponding messages specified by the Message Count value in the field 601a. The messages of FIGS. 5 and 6 support a number of transactions between the NOC 101 and the telemetry device 103. For example, server transactions involve a request being sent from a server (e.g., servers 301, 303, and 305) to the device 103 and a response sent from the device 103 to the server.

FIG. 7 is a diagram of the telemetry device of FIG. 2 deployed within the vehicle, according to an embodiment of the present invention. In this exemplary scenario, the telemetry device 103 interfaces with a vehicle electrical and electronics system 701 to obtain data relating to a variety of environmental and diagnostic information. For instance, the vehicle electrical and electronics system 701 can include electrical sensors (or switches) 703 deployed through the vehicle. These sensors 703 can relay information regarding status of the following: ignition 703a, door lock 703b, headlight 703c, seat occupancy 703d, starter 703e, cargo temperature 703f. Also, the system 701 can interface to the vehicle computer 705 through an OBDII (On board Diagnostics) interface peripheral 706. The vehicle computer 705 records information regarding, for example, speed, average speed, distance traveled, fuel level, fuel economy, distance to empty fuel tank, RPM, coolant temperature and level, oil pressure, alternator and brakes, battery voltage, windshield washer fluid level, ambient temperature, cargo temperature, and outside temperature. The data relating to the system 701 is collected by the telemetry device 103 within its data log and made available to the NOC 101.

Although the above discussion involves the telemetry device 103 collecting data in an automotive context, it is recognized that data relating to any asset can be gathered. This process of configuring the telemetry device 103 with respect to the various input/output port state(s) is explained below in FIG. 8.

Figure 8A:
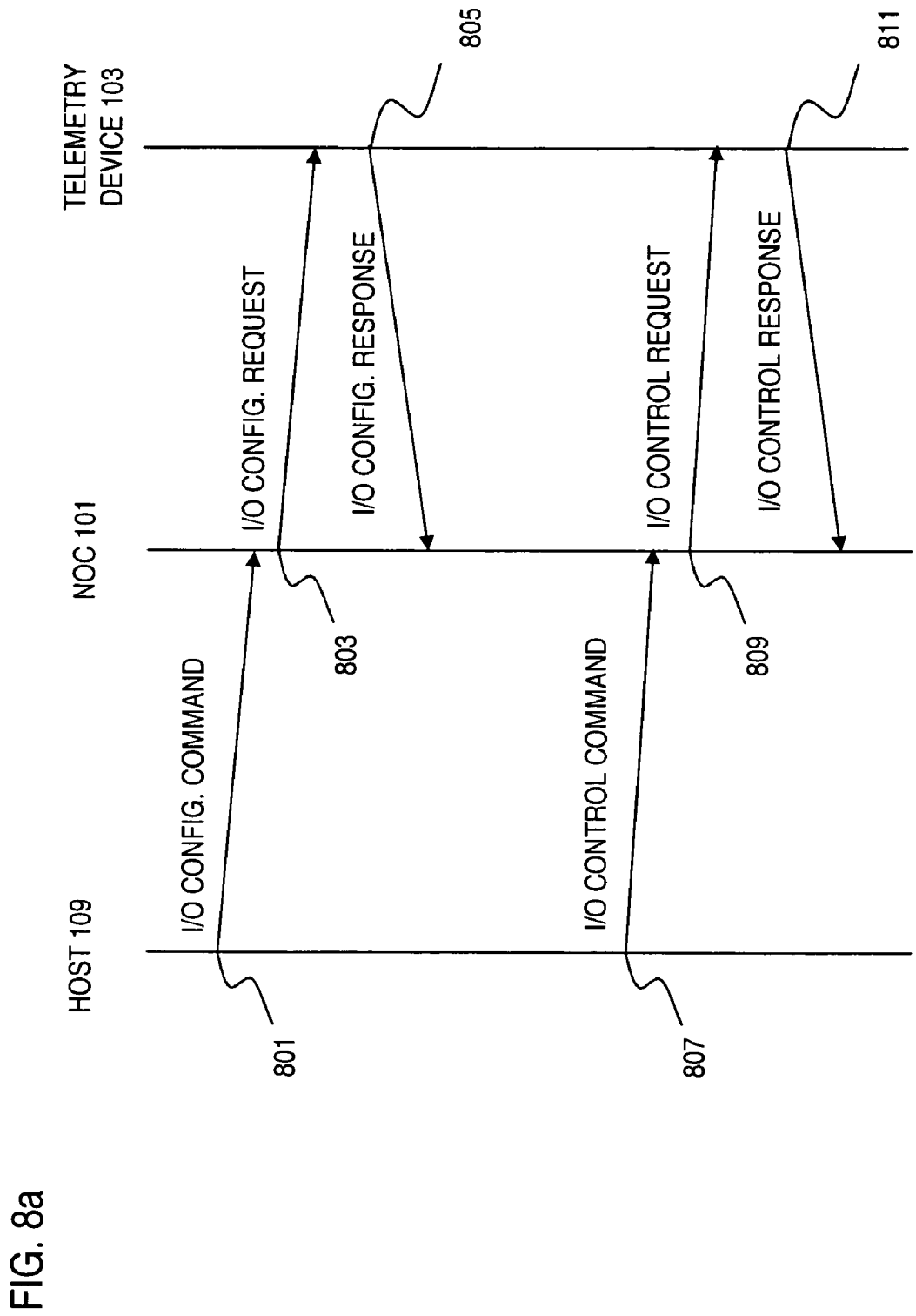
FIG. 8a shows a sequence diagram of a process for configuring and controlling the telemetry device of the system of FIG. 1.

FIG. 8a shows a sequence diagram of a process for configuring and controlling the telemetry device of the system of FIG. 1. As described earlier, the fleet and asset management system 100 advantageously supports flexibility in configuring the telemetry devices 103. Notably, the configuration changes of the programmable I/O ports 209, 211 of the telemetry device 103 can be initiated by the NOC 101 or by a user (e.g., fleet manager) using, for example, a web-based client application resident on the host 109. In this exemplary scenario, a fleet manager, using the host 109, provides an input to the web-based client application to issue an I/O configuration command to configure one or more I/O ports 209, 211 of a particular telemetry device 103, per step 801. This command is received by the NOC 101 and processed by the presentation server 311. The presentation server 311 generates an I/O configuration request message (shown in FIG. 8b for the digital I/O scenario) which specifies the parameters that are to be set relating to the I/O ports 209, 211. The messaging server 301 transmits the I/O configuration request message over the air to the telemetry device 103, as in step 803. In turn, the device 103 sends the NOC 101 an acknowledgement per an I/O configuration response message, which provides status information regarding the configuration request (per step 805).

Independent from the above steps 801-805, the host 109 can also control the operation of the telemetry device 103, such that device the state of a particular I/O port can be changed 209, 211 (e.g., starter is disabled/enabled, doors are locked/unlocked, control voltage is increased/decreased, etc.) Accordingly, an I/O control command is transmitted by the host 109 to the NOC 101, per step 807. In step 809, the NOC 101, per the presentation server 311, transmits an I/O control request message (shown in FIG. 8c for the digital I/O scenario) to instruct the telemetry device 103 to operate, such as turning On or Off, based on the I/O port 209 or setting a voltage level on the I/O port 211. In turn, the telemetry device 103 sends an acknowledgement message (i.e., I/O control response message—which can specify the status of the request), per step 811.

The messages exchanged between the NOC 101 and the telemetry device 103 are exemplary in nature, and are explained below with respect to FIGS. 8b and 8c in an exemplary scenario involving digital I/O ports 209.

Figure 8B:
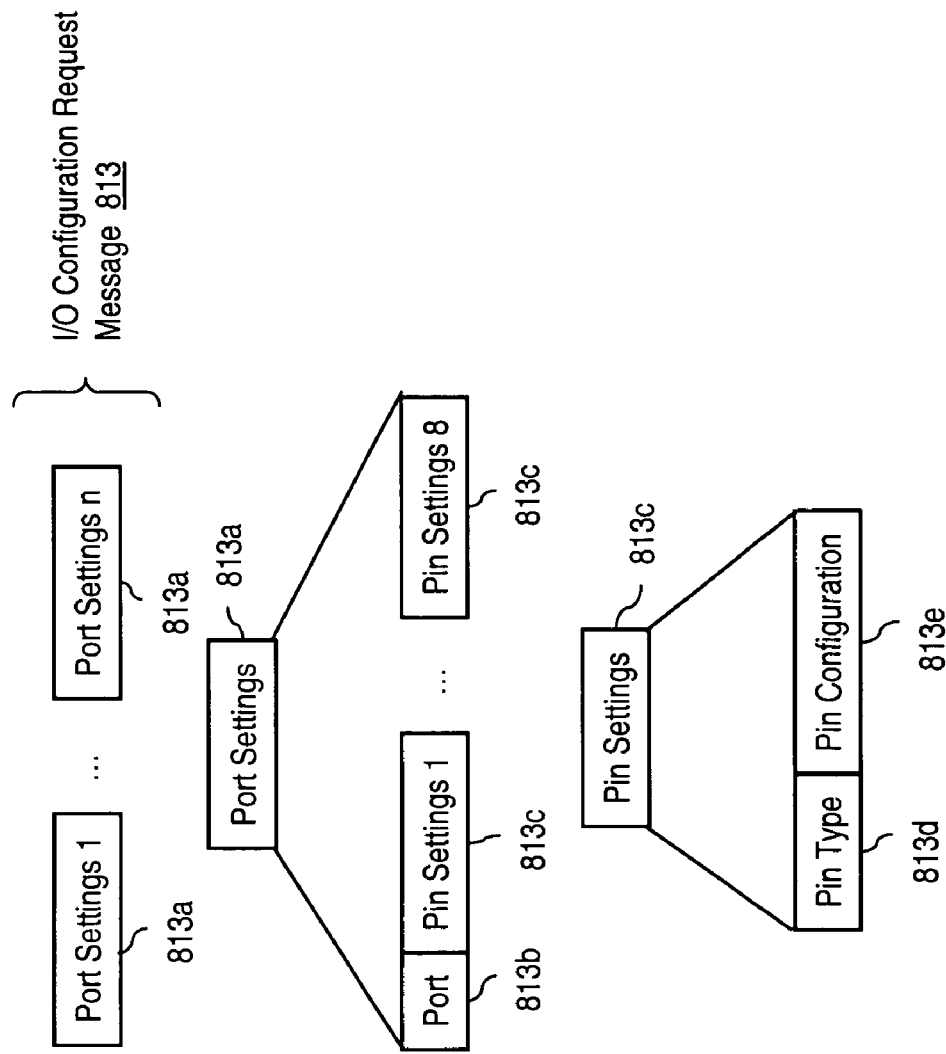
Figure 8C:
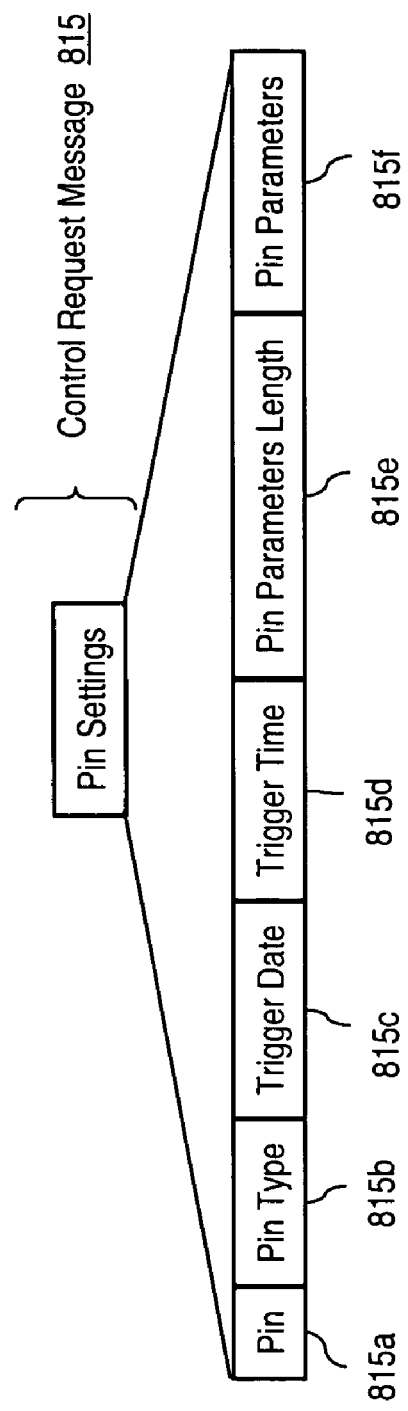

FIGS. 8b and 8c are diagrams of the formats of an Input/Output (I/O) configuration message and a I/O control message, respectively, used in the process of FIG. 8a. As seen in FIG. 8b, an I/O configuration request message 813 specifies fields 813a to accommodate the number of ports within the telemetry device 103. That is, the message 813 provides, in this example, n number of port setting fields (where n is an integer). These fields 813 constitute the data portion 401d of the UAR message (FIG. 4). Each of the Port Settings field 813a includes a Port field 813 to identify the particular port along with the pin settings of the Port via Pin Settings fields 813c. In this example, 8 Pin settings are utilized. Further, within the Pin Settings field 813c, a Pin Type field 813d is included to specify the type of Pin and its associated Pin configuration (per field 813e).

For the I/O control request message 815 (shown in FIG. 8c), the message 815 includes Port Settings fields, as described with respect to the I/O configuration request message 813. However, the Pin Settings of the I/O control request message 815 differs and includes the following fields: Pin field 815a, Pin Type field 815b, a Trigger Date field 815c, a Trigger Time field 815d, a Pin Parameters Length field 815e, and a Pin Parameters field 815f. The Pin field 815a identifies the digital I/O Pin, and the Pin Type field 815b defines the type of I/O Pin. Pin types can include, for instance, digital low output, digital high output, analog value, positive pulse, negative pulse, pulse width modulation (PWM), sinusoidal waveform, etc. The Trigger Date field 815c and the Trigger Time field 815d specify the date and time when the output action is to occur. The Pin Parameters Length field 815e specifies the length of the Pin Parameter field 815f in bytes. The parameter information in the Pin Parameter field 815f depends on the type of Pin.

Figure 9:
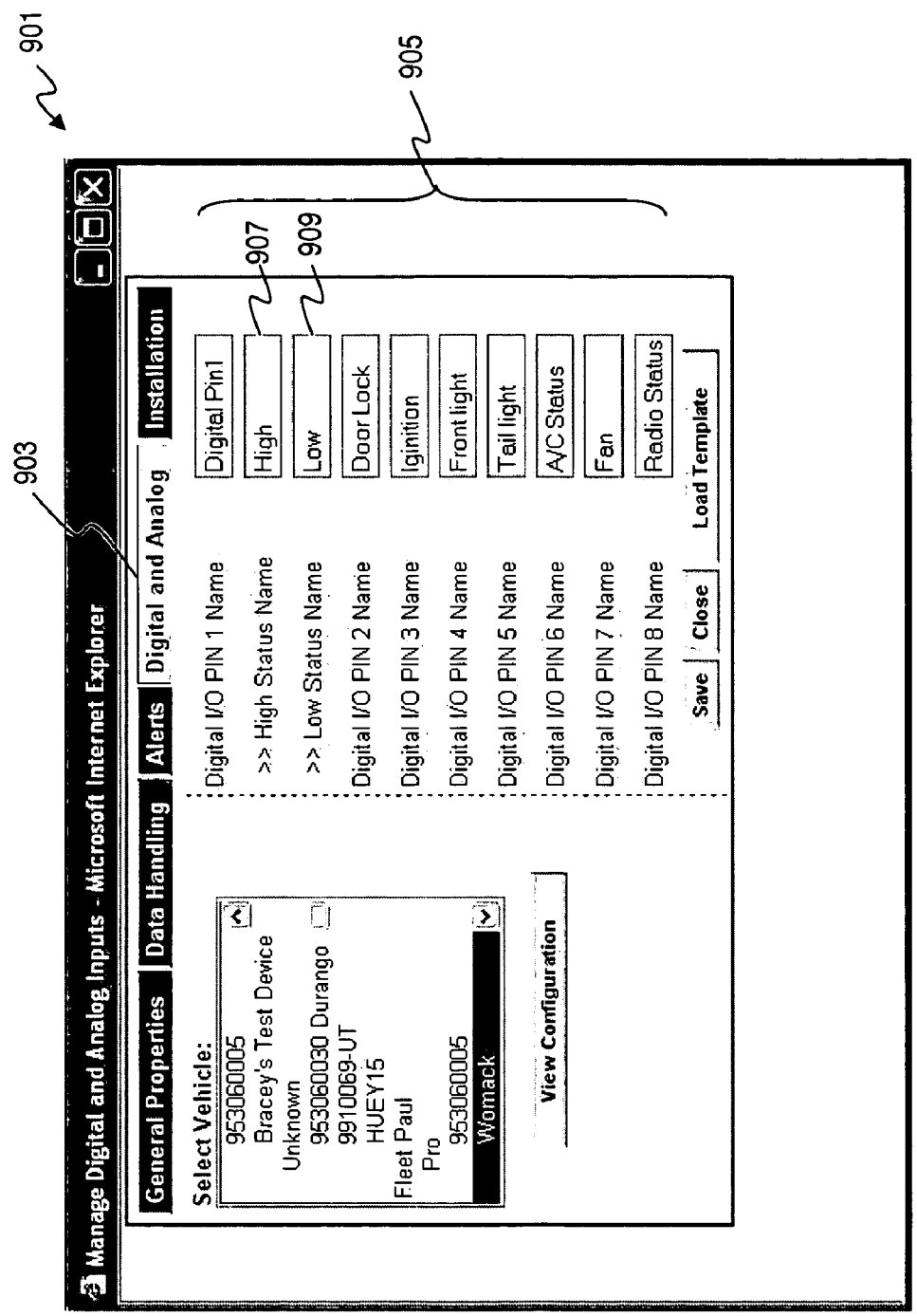
FIG. 9 is a diagram of a telemetry device configuration screen of a graphical user interface (GUI) of a client for communication with the fleet and asset management system of FIG. 1.

The user can specify the port and Pin parameters using a GUI as shown in FIG. 9.

FIG. 9 is a diagram of a telemetry device configuration screen of a graphical user interface (GUI) of a client for communication with the fleet and asset management system of FIG. 1. A configuration screen 901 permits the user to conveniently navigate through the functions of the fleet and asset management system 100. In this particular screen 901, a Digital and Analog tab 903, upon selection, displays the names of the digital I/O Pin's 905 supported by a particular telemetry device 103 within a certain vehicle, for example. The user can change the names of the Pin's by simply clicking on the corresponding text boxes. Also, upon selection of an I/O Pin, such as I/O Pin 1, the associated parameters 907, 909 are displayed to the user. These parameters 907, 909 can be readily changed by entering new text in the appropriate boxes. As seen in this screen 901, the I/O Pin's can be assigned to any type of sensor or switch.

By way of example, for digital I/O, the names can be assigned to the I/O pins and their corresponding states; e.g., I/O Pin 1 can be named Ignition Status. A low state for the Pin could be Ignition Off, while a high state may be ignition On. Other I/O's may have names associated with other states. For example, a door lock pin may be locked using a negative pulse and unlocked using a positive pulse. Hence, the Pin could be named "Door Lock" and the state (or action/pin type as described in previously); a Negative Pulse could be named "Lock" and a Positive Pulse could be named "Unlock."

Further, Analog I/O can similarly be named. In addition to the names of the states/action/pin type, the fleet and asset management system 100 supports configuration of a function to convert the digital value of an analog input/output pin (e.g., a 10-bit analog-to-digital converter has values of 0 to 1023) to scaled values that can be equated to more meaningful values. For example, an analog temperature sensor may be used such that the function converts 0 to 0 degrees Celsius, 511 converts to 50 degrees Celsius, and 1023 converts to 100 degrees Celsius.

Further, when data is presented to the user, this configuration is used to represent status rather than using generic names such as Digital Input 1, status Low or High. The functionality described above allows the system 100 to be utilized in many applications through configuration rather than through rewriting code to fit the specific application. It is also noted that the naming configuration is not transmitted to the device 103, such names or labels are used to associate names to particular I/O pins and states for presentation to the user.

Figure 10:
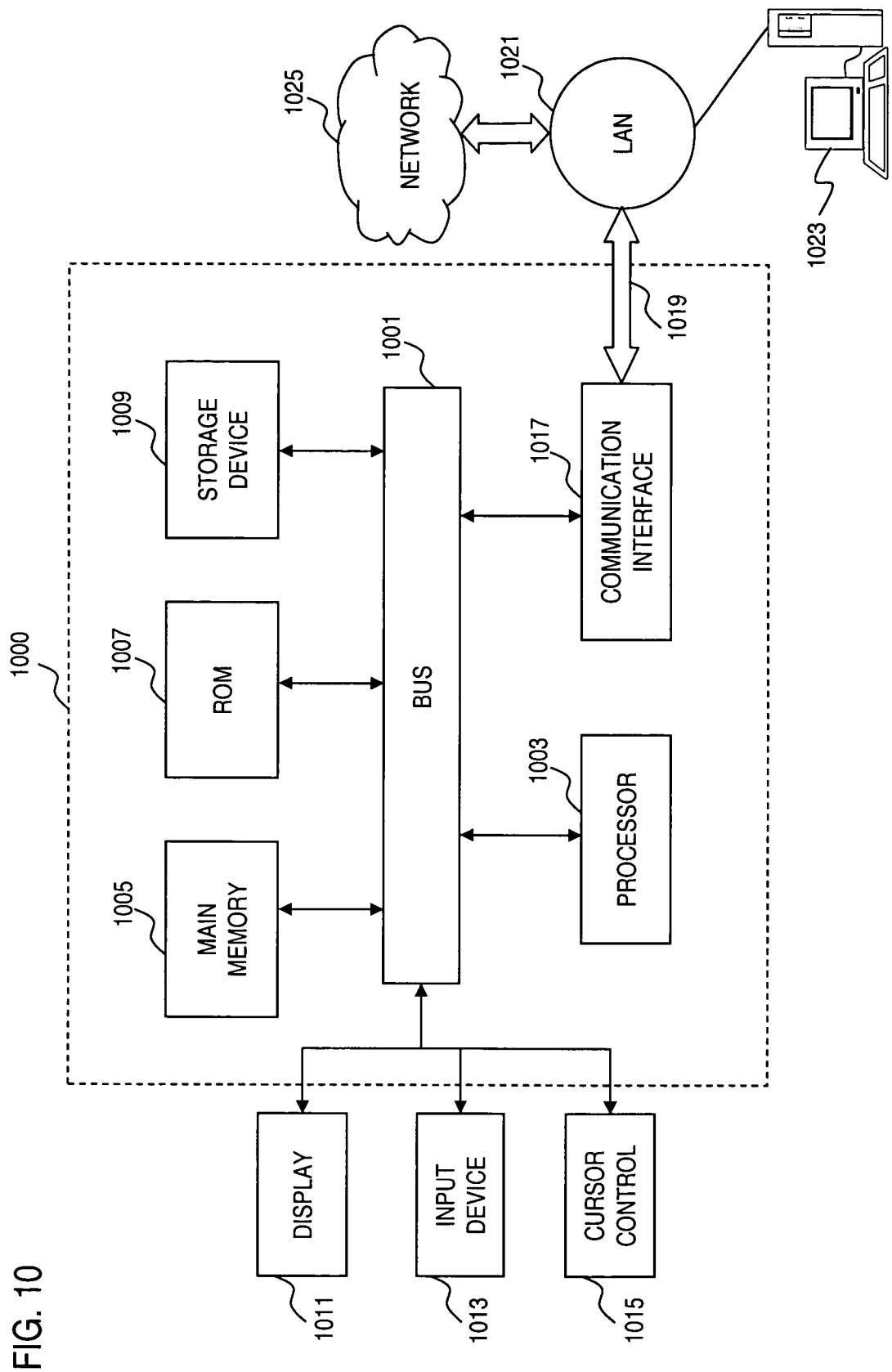
FIG. 10 is a diagram of a computer system that can be used to implement an embodiment of the present invention.

FIG. 10 illustrates a computer system 1000 upon which an embodiment according to the present invention can be implemented. For example, the client and server processes for supporting fleet and asset management can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the processes of the servers and clients in the system 100 of FIG. 1 are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1005 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The following patent applications are incorporated by reference in their entireties: co-pending U.S. patent application Ser. No. 10/759,406 filed Jan. 16, 2004, entitled "Method and System for Scheduling of Data Retrieval from Mobile Telemetry Devices"; co-pending U.S. patent application Ser. No. 10/758,770 filed Jan. 16, 2004, entitled "Method and System for Tracking Mobile Telemetry Devices," now U.S. Pat. No. 7,460,871; co-pending U.S. patent application Ser. No. 10/758,768 filed Jan. 16, 2004, entitled "Method and System for Mobile Telemetry Device Prioritized Messaging"; co-pending U.S. patent application Ser. No. 10/758,930 filed Jan. 16, 2004, entitled "Method and System for Interfacing with Mobile Telemetry Devices," now abandoned; co-pending U.S. patent application Ser. No. 10/759,404 filed Jan. 16, 2004, entitled "Method and System for Transmitting Assistance Location Data for Fleet and Asset Management," now abandoned; co-pending U.S. patent application Ser. No. 10/758,213 filed Jan. 16, 2004, entitled "Method and System for Tracked Device Location and Route Adherence via Geofencing," now U.S. Pat. No. 7,164,986; and co-pending U.S. patent application Ser. No. 10/758,199 filed Jan. 16, 2004, entitled "Method and System for Secured Wireless Data Transmission to and from a Remote Device," now U.S. Pat. No. 7,577,836.

While the present invention has been described in connection with a number of embodiments and implementations, the present invention is not so limited but covers various obvious modifications and equivalent arrangements, which fall within the purview of the appended claims.

What is claimed is:

1. A method for configuring telemetry devices over a wireless network, the method comprising:
  transmitting a configuration message over the wireless network to one of the telemetry devices for configuring a programmable input/output (I/O) port of the one telemetry device, wherein the I/O port couples to an object, and the one telemetry device sets parameters relating to the I/O port according to the configuration message;
  receiving data corresponding to the I/O port of the one telemetry device for managing a plurality of objects corresponding to the telemetry devices, wherein the wireless network is a two-way paging system;
  receiving a location data request for Assisted-Global Positioning System (A-GPS) data over the wireless network from the one telemetry device; and
  transmitting the A-GPS data in response to the location data request, wherein the one telemetry device determines location of the object based upon the A-GPS data.

2. A method according to claim 1, further comprising:
  transmitting a control message to the one telemetry device, in response to the control message the one telemetry device controlling one of the object via the I/O port and status of the I/O port.

3. A method according to claim 2, wherein a signal is received over the I/O port controls operation of the one telemetry device.

4. A method according to claim 3, wherein the object is an automobile, and the signal represents an output of a sensor or a switch of the automobile.

5. A method according to claim 1, wherein the one telemetry device autonomously obtains GPS data to determine the location of the object.

6. A method according to claim 1, further comprising:
  receiving a message from a client to initiate transmission of the configuration message.

7. A method according to claim 1, wherein the wireless network has a protocol that specifies a format for the configuration message including,
  a field for providing port settings including,
    a port field specifying the I/O port, and
    a pin setting field for specifying pin settings for the I/O port, wherein the pin setting field specifies information on type of pin and information on configuration of the pin.

8. A fleet and asset management system for configuring telemetry devices over a wireless network, the system comprising:
  a presentation server configured to generate a configuration message for transmission over the wireless network to one of the telemetry devices for configuring a programmable input/output (I/O) port of the one telemetry device, wherein the I/O port couples to an object, and the one telemetry device sets parameters relating to the I/O port according to the configuration message;
  a messaging server configured to transmit the configuration message and to receive data corresponding to the I/O port of the one telemetry device for managing a plurality of objects corresponding to the telemetry devices, wherein the wireless network is a two-way paging system; and
  a GPS server configured to receive a location data request for Assisted-Global Positioning System (A-GPS) data over the wireless network from the one telemetry device, and to transmit the A-GPS data in response to the location data request,
  wherein the one telemetry device determines location of the object based upon the A-GPS data.

9. A system according to claim 8, wherein the presentation server generates a control message for transmission to the one telemetry device, in response to the control message the one telemetry device controlling one of the objects via the I/O port and status of the I/O.

10. A system according to claim 9, wherein a signal is received over the I/O port controls operation of the one telemetry device.

11. A system according to claim 10, wherein the object is an automobile, and the signal represents an output of a sensor or a switch of the automobile.

12. A system according to claim 8, wherein the one telemetry device autonomously obtains GPS data to determine the location of the object.

13. A system according to claim 8, wherein the presentation server receives a message from a client to initiate transmission of the configuration message.

14. A system according to claim 8, wherein the wireless network has a protocol that specifies a format for the configuration message including,
  a field for providing port settings including,
    a port field specifying the I/O port, and
    a pin setting field for specifying pin settings for the I/O port; wherein the pin setting field specifics information on type of pin and information on configuration of the pin.

15. A computer-readable storage medium carrying one or more sequences of one or more instructions for configuring telemetry devices over a wireless network, the one or more sequences of one or more instructions including instructions which, when executed by one or more processors, cause the one or more processors to perform the steps of:
  transmitting a configuration message over the wireless network to one of the telemetry devices for configuring a programmable input/output (I/O) port of the one telemetry device, wherein the I/O port couples to an object, and the one telemetry device sets parameters relating to the I/O port according to the configuration message;
  receiving data corresponding to the I/O port of the one telemetry device for managing a plurality of objects corresponding to the telemetry devices, wherein the wireless network is a two-way paging system;

receiving a location data request for Assisted-Global Positioning System (A-GPS) data over the wireless network from the one telemetry device; and transmitting the A-GPS data in response to the location data request, wherein the one telemetry device determines location of the object based upon the A-GPS data.

16. A computer-readable storage medium according to claim 15, further including instructions for causing the one or more processors to perform the step of:

transmitting a control message to the one telemetry device, in response to the control message the one telemetry device controlling one of the object via the I/O port and status of the I/O.

17. A computer-readable storage medium according to claim 16, wherein a signal is received over the I/O port controls operation of the one telemetry device.

18. A computer-readable storage medium according to claim 17, wherein the object is an automobile, and the signal represents an output of a sensor or a switch of the automobile.

19. A computer-readable storage medium according to claim 15, wherein the one telemetry device autonomously obtains GPS data to determine the location of the object.

20. A computer-readable storage medium according to claim 15, further including instructions for causing the one or more processors to perform the step of:

receiving a message from a client to initiate transmission of the configuration message.

21. A method for configuring telemetry devices over a wireless network, the method comprising:

communicating with a fleet and asset management system to obtain information about a plurality of objects;

receiving a user input relating to configuration of one of a plurality of telemetry devices corresponding to the plurality of objects; and in response to the user input, transmitting the user input to the fleet and asset management system, wherein the fleet and asset management system generates a configuration message based on the user input for transmission over the wireless network, including a two-way paging system, to the one telemetry device for configuring an input/output (I/O) port of the one telemetry device according to a protocol adapted for the two-way paging system, the I/O port being coupled to a corresponding one of the objects, and the one telemetry device setting parameters relating to the I/O port according to the configuration message.

22. A method according to claim 21, further comprising:

receiving another user input to instruct the fleet and asset management system to transmit a control message to the one telemetry device, in response to the control message the one telemetry device controlling one of the objects via the I/O port and status of the I/O port.

23. A method according to claim 22, wherein a signal received over the I/O port controls operation of the one telemetry device.

24. A method according to claim 23, wherein the object is an automobile, and the signal represents an output of a sensor or a switch of the automobile.

25. A method according to claim 21, wherein the wireless network is a two-way paging system and includes a Global Positioning System (GPS) reference network for providing Assisted-Global Positioning System (A-GPS) data to the telemetry devices for determining locations of the corresponding objects, the one telemetry device being configured to determine autonomously location of the corresponding object.

26. A client device for configuring telemetry devices over a wireless network, the client device comprising:

means for communicating with a fleet and asset management system to obtain information about a plurality of objects;

means for receiving a user input relating to configuration of one of a plurality of telemetry devices corresponding to the plurality of objects; and means for transmitting the user input to the fleet and asset management system, in response to the user input, wherein the fleet and asset management system generates a configuration message based on the user input for transmission over the wireless network, including a two-way paging system, to the one telemetry device for configuring an input/output (I/O) port of the one telemetry device according to a protocol adapted for the two-way paging system, the I/O port being coupled to a corresponding one of the objects, and the one telemetry device setting parameters relating to the I/O port according to the configuration message.

27. A client device according to claim 26, wherein another user input is received instructing the fleet and asset management system to transmit a control message to the one telemetry device, in response to the control message the one telemetry device controlling the corresponding one of the objects via the I/O port.

28. A client device according to claim 27, wherein a signal received over the I/O port controls operation of the one telemetry device.

29. A client device according to claim 28, wherein the object is an automobile, and the signal represents an output of a sensor or a switch of the automobile.

30. A client device according to claim 26, wherein the wireless network is a two-way paging system and includes a Global Positioning System (GPS) reference network for providing Assisted-Global Positioning System (A-GPS) data to the telemetry devices for determining locations of the corresponding objects, the one telemetry device being configured to determine autonomously location of the corresponding object.

* * * * *